P. DIEHL.
MECHANICAL MOVEMENT.
APPLICATION FILED FEB. 8, 1911.
1,047,003.
Patented Dec. 10, 1912.
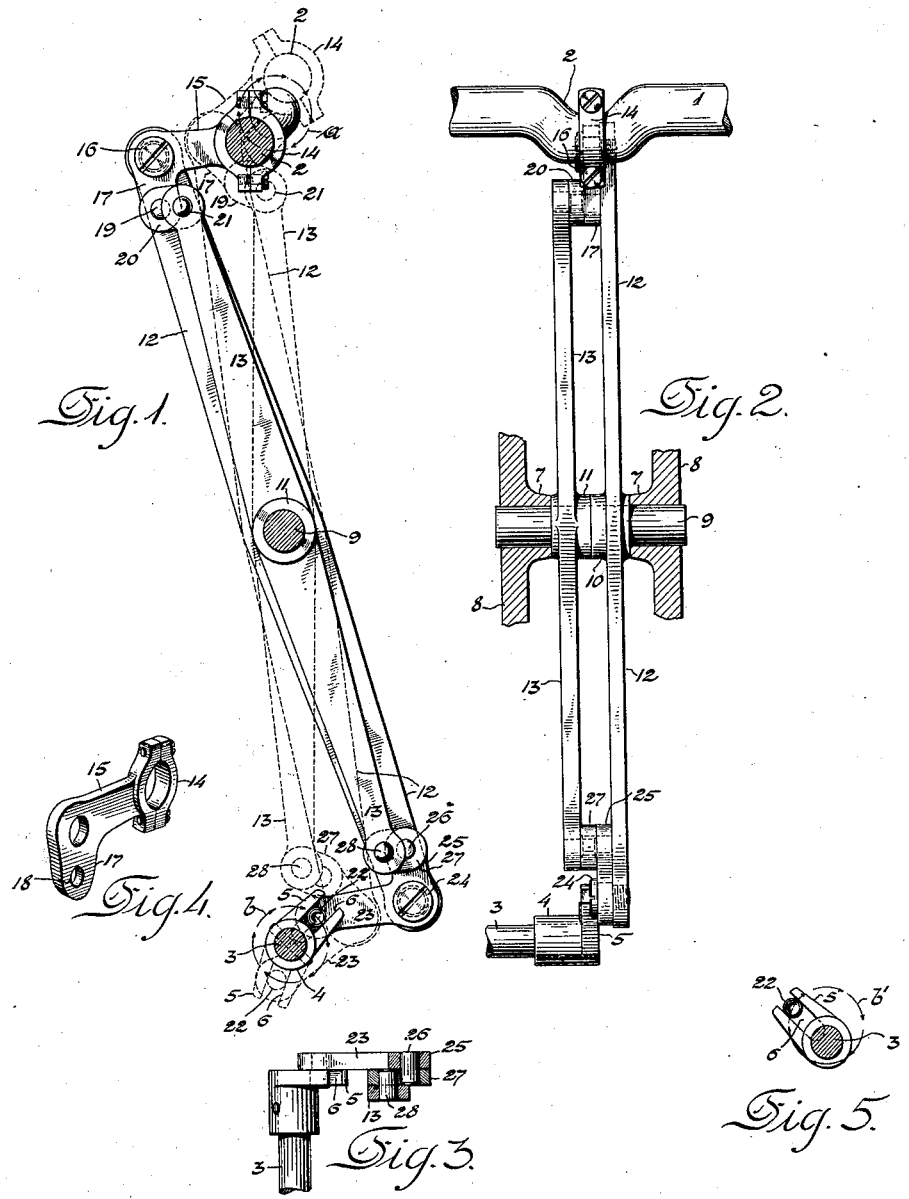
WITNESSES:
INVENTOR

UNITED STATES PATENT OFFICE.

PHILIP DIEHL, OF ELIZABETH, NEW JERSEY, ASSIGNOR TO THE SINGER MANUFACTURING COMPANY, A CORPORATION OF NEW JERSEY.

MECHANICAL MOVEMENT.

1,047,003.   Specification of Letters Patent.   Patented Dec. 10, 1912.

Application filed February 8, 1911. Serial No. 607,386.

*To all whom it may concern:*

Be it known that I, PHILIP DIEHL, a citizen of the United States, residing at Elizabeth, in the county of Union and State of New Jersey, have invented certain new and useful Improvements in Mechanical Movements, of which the following is a specification, reference being had therein to the accompanying drawings.

This invention relates to an improvement in motion-transmitting devices for communicating either uniform or variable rotary motion from one shaft to another, and is designed more particularly for use in fast running machines, such as high-speed sewing machines.

The invention has for its object to provide a simple and durable transmitting connection between the driving and driven shafts, and one in which the weight of the parts subjected to bodily reciprocatory movement shall be reduced to a minimum so as to produce the least possible vibration of the structure in which it is incorporated when operated at high speeds.

In its preferred embodiment the improvement comprises, in conjunction with the driving and driven shafts each provided with a crank, a fixed fulcrum intermediate said shafts upon which are mounted two rock-levers sustained against endwise movement thereon, one of said rock-levers having pivotally mounted thereon at opposite ends elbow-links each having one arm connected respectively with the cranks of the driving and driven shafts and the other arm connected by means of a link or other loose joint with the end of the other rock-lever. The connection between one elbow-link and the crank of the driving shaft imparts to the same bodily reciprocating and rocking movements upon its fulcrum-pin upon the first-mentioned rock-lever which movements are transmitted through the two rock-levers to the other elbow-link which communicates to the driven-shaft crank its rotary movements. By suitable variations in the proportions and arrangements of the parts the rotary motion imparted to the driven shaft from the driving shaft may be made variable in speed so as to produce successively accelerated and retarded movements in each rotation.

In the accompanying drawings, Figure 1 is a side elevation and Fig. 2 an edge view of motion-transmitting mechanism embodying the present improvement, and Fig. 3 is a plan of the same in transverse section through the link connection of the driven elbow-link with its controlling rock-lever. Fig. 4 is a perspective view of the driving elbow-link. Fig. 5 is a sectional elevation of the driven shaft with its slotted crank-arm and actuating roller-stud so disposed as to derive from the latter a variable rotating movement.

The driving shaft 1 is shown in the drawings provided with an integral crank 2, and the driven shaft 3 has secured upon one extremity the hub 4 of the crank-arm 5 formed with the radial slot 6 shown in Fig. 5 as extending inwardly nearly to the axis of rotation beyond the extremity of the shaft. Intermediate the shafts 1 and 3 is mounted within the stationary bearing bosses 7 of the frame 8 the short shaft 9 constituting a stationary fulcrum upon which are independently mounted the hubs 10 and 11 of the actuating and controlling rock-levers 12 and 13, respectively, the latter being somewhat shorter than the former.

Embracing the crank 2 of the driving shaft is the strap 14 at one end of the lateral arm 15 of the driving elbow-link pivotally mounted by means of the stud-screw 16 upon the upper end of the actuating rock-lever 12 and having a depending arm 17 formed with an aperture 18. The aperture 18 of the elbow-link is entered by a pivotal pin 19 carried by the short link 20 which is provided with an oppositely extending pin 21 which enters an aperture in the upper end of the controlling rock-lever 13. As will be evident by reference to the full and dotted line representations in Fig. 1, the rotation of the driving shaft imparts to the rock-levers 12 and 13 differential vibratory movements, the actuating rock-lever receiving its movements directly from the crank 2 through the arm 15 of the elbow-link and the controlling lever 13 deriving its movements through the link 20 from the rocking and bodily reciprocating movements of the depending arm 17 of the elbow-link.

Entering the fork 6 of the driven-shaft crank-arm 5 is a roller-stud 22 carried by the lateral arm 23 of the driven elbow-link which is pivotally mounted by means of the stud-screw 24 upon the lower extremity of the actuating rock-lever 12 and is provided with an upwardly extending arm 25 formed with an aperture entered by the pin 26 extending from one face of the short link 27 from whose opposite face extends the pin 28 entering an aperture in the lower extremity of the controlling rock-lever 13.

As the dimensions of the elbow-links and the upper and lower arms of the actuating and controlling rock-levers are equal in the embodiment illustrated in Figs. 1 to 4 inclusive, it will be observed that the circle of travel $a$ of the center of the crank 2 will be reproduced in a circle of travel $b$ of the roller-stud 22; and if the driven shaft 3 be disposed concentrically with the path of travel $b$ of the roller-stud 22, the speed of rotation of the driven shaft will be the same at all points as that of the driving shaft. By so disposing the parts, however, that the driven shaft 3 is in eccentric relation to the circular path of travel $b'$ of the roller-stud 22, as represented in Fig. 5, it will be observed that the movement of the roller-stud 22 through one-half of its circumference of travel will cause it to traverse an arc less than a semi-circumference around the driven shaft 3, while the completion of the rotation of the roller-stud will cause it to pass through an arc around the driven shaft greater than a semi-circumference, thus producing an alternately retarded and accelerated rotary movement of the driven shaft for each uniform rotation of the driving shaft. It is obvious that by changing the proportions of the component parts of the transmitting mechanism the actuating roller-stud 22 may be caused to traverse elliptical paths, which will produce other modes of variation in the rotation of the driven shaft from that above described. Thus, by inversely changing the lengths of the rocker-arm 26 and the lower arm of the controlling rock-lever 13 so as to bring the pivotal pins 26 and 28 nearer the fulcrum 9, the lower elbow link will receive a shorter rocking movement on its stud-screw 24 carried by the rock-lever 12, and the path of movement $b$ of the roller-stud 22 will become an ellipse with its major axis substantially horizontal. A shortening of the rocker-arm 25 and corresponding lengthening of the rock-lever arm 13 will cause an increased oscillatory movement of the member 23 upon its stud-screw 24 and change the circle of travel $b$ into an ellipse with its major axis substantially vertical.

From the foregoing description, it will be seen that the present improvement is not limited to the specific embodiment herein shown and described, but is susceptible of very material modification within the scope of the present invention.

Having thus set forth the nature of the invention, what I claim herein is:—

1. In combination, a driving shaft, a driven shaft, a crank fixed upon each shaft, a rock-lever having independent operative connections with said cranks, a fixed fulcrum upon which said rock-lever is sustained against endwise movement, and positively acting means directly connected with and actuated by said rock-lever for controlling the direction of rotation imparted to the driven shaft by said rock-lever relatively to that of the driving shaft.

2. In combination, a driving shaft, a driven shaft, a crank fixed upon each shaft, a rock-lever, a fulcrum therefor, links each connected at one end independently of the other with said rock-lever and at the opposite end respectively with the cranks of said driving and driven shafts, and a connection between said links at points thereof offset from the line of connection of the same with said rock-lever and their respective shafts for controlling the direction of rotation of the driven shaft relatively to that of the driving shaft.

3. In combination, a driving shaft, a driven shaft, a fixed fulcrum, an actuating rock-lever mounted upon said fulcrum, an operative connection between the driving shaft and said rock-lever whereby the latter is vibrated, an operative connection between the rock-lever and the driven shaft through which the latter derives rotary movements, a controlling rock-lever also mounted on said fixed fulcrum, means acting through the connection of the actuating rock-lever with the driving shaft for imparting to the controlling rock-lever differential vibratory movements relative to those of the actuating rock-lever, and means connected with the controlling rock-lever for determining the direction of action of the connection between the actuating rock-lever and the driven shaft.

4. In combination, a driving shaft, a driven shaft, a crank carried by each shaft, a pair of rock-levers each mounted upon a stationary fulcrum in fixed relation to its ends, and elbow-links each fulcrumed upon one of said rock-levers and having one arm connected with the other of said rock-levers and the other arm connected with a crank upon the driving and driven shafts, respectively.

5. In combination, a driving shaft, a driven shaft, a crank carried by the driving shaft, a stationary fulcrum, actuating and controlling rock-levers mounted for independent movement upon said fulcrum, an operative connection between the actuating rock-lever and the crank of the driving shaft, a connection between said rock-levers whereby the controlling rock-lever is vibrated relatively to the actuating rock-lever, a rocker carried by the actuating rock-lever, a pin carried by said rocker and movable in a path alternately approaching and receding from the axis of the driven shaft, an operative connection between said pin and the driven shaft, and a connection between the controlling rock-lever and said rocker whereby said pin mounted upon the latter is given its described path of movement.

In testimony whereof, I have signed my name to this specification, in the presence of two subscribing witnesses.

PHILIP DIEHL.

Witnesses:
H. A. KORNEMANN, Jr.,
W. P. STEWART.

Copies of this patent may be obtained for five cents each, by addressing the "Commissioner of Patents, Washington, D. C."